Figure 1:
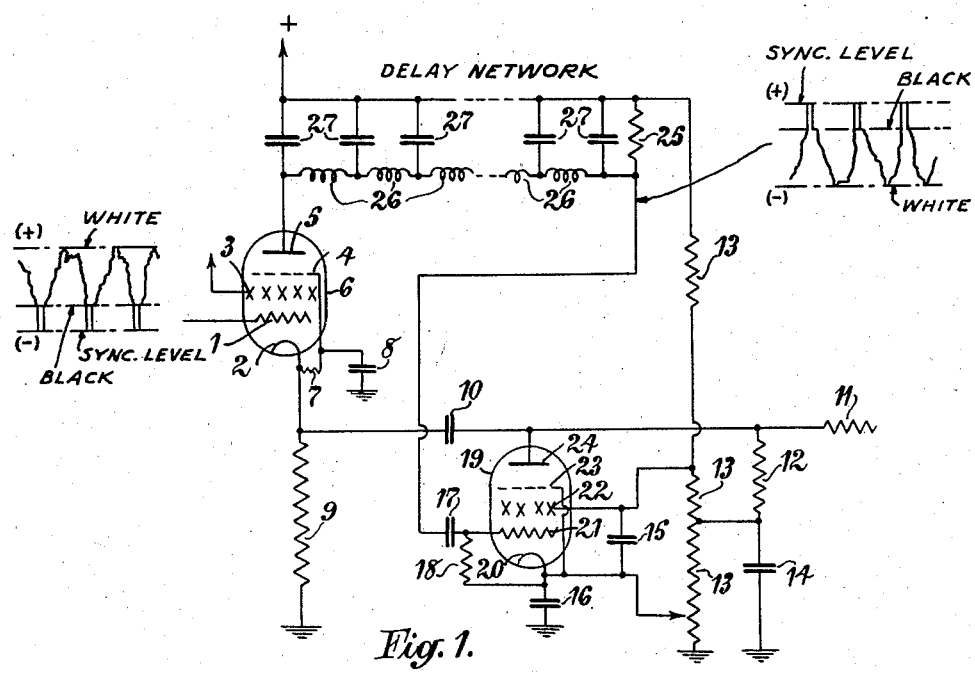

Dec. 31, 1940.   A. D. BLUMLEIN ET AL   2,227,056
BACKGROUND REINSERTER
Filed Nov. 7, 1938

INVENTORS
ALAN D. BLUMLEIN
E. L. C. WHITE
BY
ATTORNEY

Patented Dec. 31, 1940

2,227,056

UNITED STATES PATENT OFFICE 2,227,056

BACKGROUND REINSERTER

Alan Dower Blumlein, Ealing, London, and Eric Lawrence Casling White, Hillingdon, England, assignors to Electric & Musical Industries Limited, Hayes, England, a company of Great Britain Application November 7, 1938, Serial No. 239,372
In Great Britain November 6, 1937

3 Claims. (Cl. 178—7.3)

(Granted under the provisions of sec. 14, act of
March 2, 1927; 357 O. G. 5)

The present invention relates to apparatus for handling electrical signals (representative of intelligence) which include, at spaced time intervals, check signals each of which has a switching portion and a datum portion.

One aspect of the present invention deals more particularly with a modification of the methods described in British Patent Specifications 449,242 and 458,585 for maintaining a constant datum level in electrical signals, while another aspect concerns a modification of the invention outlined in British Patent Specification 458,585 for providing automatic correction for variations in amplitude of such signals.

In British Patent Specification No. 449,242 is described a method of producing from an input signal, from which the D. C. component is absent, an electrical output signal in which the D. C. component is present, the input signal being such that at periods it has a datum value which would be a fixed potential were the D. C. component present, characterised in that the input signal is applied through a main channel to a stabilising device, and that a switching signal is applied through an auxiliary channel to the stabilising device to switch the stabilising device from the inoperative condition into the operative condition at least during said periods, the stabilising device, when switched into the operative condition causing the datum values of the signal to assume a fixed pre-determined potential.

In the prior British Patent Specification No. 458,585 is described a method of correcting for variations in the effective amplitude of electrical signals representative of intelligence, such as may arise in the transmission of said signals as a result of the complete or partial loss of the D. C. component of said signals, the incorrect representation of that component, or varying attenuation of the signals, the said method comprising transmitting at spaced time intervals along the channel through which the intelligence signals are passed, check signals each of which has a switching portion and a datum portion, said datum portion having, at the input of said channel, either a predetermined fixed amplitude value or a predetermined wave form comprising fixed amplitude values and the said method being characterised in that the datum portions are applied through one path to an observing device, while the switching portions, or switching signals derived therefrom, are fed to said observing device through another path, and serve to change said observing device from the inoperative condition into the operative condition, said observing device, when in the operative condition, serving to develop a corrective signal dependent upon the amplitude or amplitude and wave form of the datum portions applied thereto, and said corrective signal being applied at a point either before or after the observing point to compensate wholly or in part for said variations in effective amplitude.

As applied to television in a known system use is made of a small black interval following every synchronising signal in order to stabilise or observe the level of black. In order to effect this, a stabilising or observing device is switched on during the black period by a specially prepared control signal. This control signal is carefully arranged to have a time period falling within the black interval. Now it has been found that with certain arrangements of stabilising or observing devices the control signal can be considerably longer than the black interval, thus leading to a greater ease in producing the pulse.

According to the invention an arrangement for stabilising indicating, observing or controlling a datum level intermediate the peak amplitudes of a signal wave (as, for example, the black level of a television signal) is provided comprising a stabilising or observing device and means for applying to said device a control signal to cause said device to be rendered operative for a part or whole of the duration of said datum level, and wherein said control signal is arranged to be of such duration and is applied to said device at such a time that the latter is rendered operative during said datum period and during portions of said signal wave immediately following or preceding said datum level, the stabilising or observing device being so arranged as to be substantially unaffected by portions of said signal wave not at datum level falling within the duration of said control signal.

Preferably the control signal is developed by means of an electrical time delay from a suitable signal (such, for example, as a synchronising pulse) transmitted immediately prior to said datum level.

Of course, the datum level may precede the suitable signal (synchronising pulse), in which case the signal containing the datum level is delayed by means of a suitable delay network or alternatively the synchronising pulse can be delayed by a period approximately equal to the time between successive pulses less the datum period.

The invention may be employed in a transmitter or receiver for handling electrical signals which include at spaced time intervals, check signals each of which has a switching portion and a datum portion, in order to stabilise said datum portion i. e. to reinsert the D. C. component of the signals if the latter has been lost.

The invention may also be used for the operation of an observing device in a transmitter or receiver for the purpose of providing a suitable corrective signal in order to compensate for any variations in effective amplitude of such electrical signals.

Figure 2:
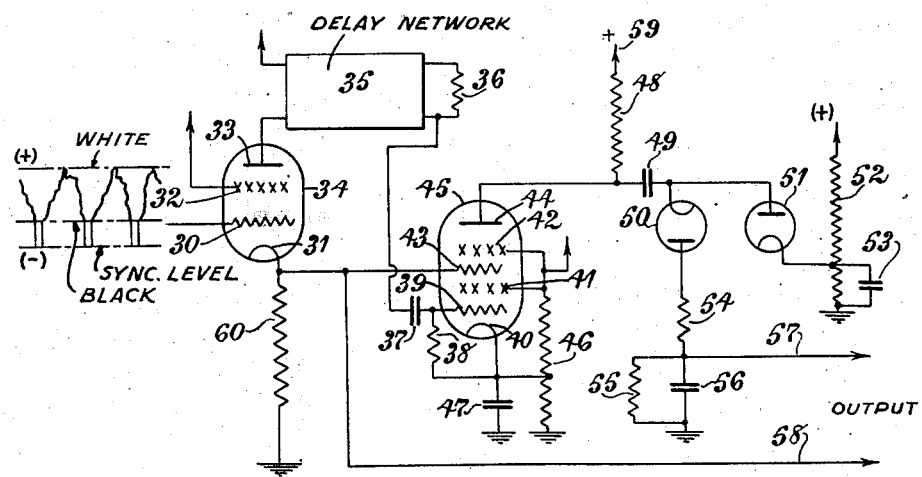

The invention will be described with reference to the accompanying drawing in which Figures 1 and 2 are circuit diagrams illustrating particular embodiments of apparatus according to this invention.

For ease of description, the embodiment shown in Figure 1 will be described with particular reference to a well-known standard of television transmission in which the black level is maintained at approximately 30% of the peak signal representing peak white and the synchronising signals consist of pulses which reduce the amplitude of the signal from the black level in a "blacker than black" direction to zero. The line synchronising pulses of 10 micro-seconds duration on the standard transmitted waveform are followed by black level intervals constituting the said datum periods lasting 5 micro-seconds. The frame synchronising pulses are of 40 micro-seconds duration and are followed by black level intervals of 10 micro-seconds duration likewise constituting datum periods. Signals of this waveform are illustrated on page 373 of the issue of "The wireless world" of the 4th October, 1935.

In Figure 1, 6 represents a pentode valve in which 1 is the control grid, 2 is the cathode, 3 is the screening grid, 4 the suppressor grid and 5 is the anode. The cathode 2 is connected by means of a high resistance 9 to earth and is also connected by a high resistance 7 to the suppressor grid 4 which is by-passed to earth by condenser 8. The screening grid 3 is connected to a source of positive potential which is not shown. The anode 5 of the valve 6 is connected to a positive source of potential through a time delay network comprising inductances 26, condensers 27 and the terminating resistance 25 from which control signals derived from the synchronising signals are obtained. The cathode 2 of valve 6 is connected via a condenser 10 to the grid 11 of a further valve not shown. Grid 11 is connected through a high resistance 12 to a tapping on the potentiometer 13 connected between the source of positive potential and earth. The condenser 14 between the tapping and earth is for decoupling purposes. The output from the delay network is passed through a condenser 17 to the grid 21 of a further pentode valve 19 forming a stabilising device, the grid 21 and cathode 20 being joined by a leak resistance 18. The cathode 20 is by-passed to earth by condenser 16 and is biassed slightly positively by means of a variable tap on potentiometer 13. The screening grid 22 of valve 19 is connected to a suitable point on the potentiometer 13 and is by-passed to cathode 20 by condenser 15. The suppressor grid 23 is directly connected to the cathode 20. The anode 24 of pentode valve 19 is connected to the grid 11 of the further valve.

In operation, television signals of the standard waveform are applied to the grid 1 of the valve 6 with the synchronising signals in a negative sense, it being assumed in the first place that the D. C. component is present but that the signals vary in strength owing to a variable attenuation. It is thus apparent that the datum level will alter in absolute value and consequently the absolute black level will vary. The first valve 6 acts as a cathode follower to provide a low impedance coupling to the valve 19. A cathode follower valve is one in which the potential of the cathode thereof follows substantially the potential of the control grid. The suppressor grid 4 is held at mean cathode potential by the leak resistance 7. The potential on the suppressor grid does not vary with the cathode potential variations owing to the by-pass condenser 8. This device provides the correct suppressor potential while relieving the circuit of the extra cathode capacity which would be entailed by the use of a direct cathode-suppressor grid connection. The use of the condenser 8 and resistance 7 in this manner is a feature of the invention and can be employed other than in connection with the features of the present application. In the absence of signals, the grid 11 tends towards a positive potential on account of leak resistance 12, which is connected to the tap on the potentiometer 13, but is prevented from going very positive by the anode 24 of the pentode 19 which represents a low resistance to its cathode 20 which is held at a lower potential than 11 by the tapping on potentiometer 13. The grid 21 of this valve is connected to its cathode 20 by a leak resistance so that in the absence of signal the grid is at cathode potential, thus making the valve conducting.

When signals are applied to grid 1, delayed signals will appear on the grid of pentode 19 owing to the delay network 26—27 with synchronising signals in a positive sense. As explained in British Patent Specification 422,906 these synchronising signals will just cause grid current to flow and charge the grid condenser 17 so as to re-establish the direct current component on the grid of valve 19 with peak synchronising signals just passing grid current. The input at 1 must be sufficient to cause the synchronising amplitude on the grid of 19 to cover the grid base of such valve, that is valve 19 must be cut-off for all values of signal (black and picture signals) other than synchronising signals.

As mentioned previously, the line synchronising signals are approximately 10 micro-seconds long and are followed by 5 micro-seconds of black. The delay network in the anode circuit of valve 6 delays the signals to valve 19 by 4.5 micro-seconds providing control sgnals which are of larger duration than the datum periods. The valve 19 is therefore switched on during the last 5.5 micro-seconds of the line synchronising period and the first 4.5 micro-seconds of black. When operating, the current passed by the anode of pentode 19 is sufficient to charge condenser 10 so that the black signals are slightly above the cathode (20) potential, thus passing a small anode current in each black interval to make up for the charge leaking away through leak resistance 12. Although the grid of valve 19 is made positive for 10 micro-seconds of which 5.5 are outside the black period, this does not upset the operation since the synchronising signals drive the anode of valve 19 negative and so are ineffective to pass anode current in 19, which as stated above is the black level "stabilising" valve.

The leak resistance 12 is taken to a slight positive potential to ensure that condenser 10 is discharged rapidly enough to follow any negative wander of black due to variable attenuation of the signals and to ensure that black signals pass anode current through valve 19. The effective time constant of condenser 10 and leak resistance 12 must be short enough to follow any wander of black level on grid 1.

The delay network in the anode circuit of valve 6 may comprise, for example, nine inductances and ten condensers terminated by a suitable resistance, each section giving a delay of half a micro-second. Suitable values are 1 millihenry for each inductance, a 2000 ohm terminating resistance and each condenser having a capacity of 250 micro-microfarads, except for the end condenser which has a capacity of 125 micro-microfarads. A value of 4.5 micro-seconds delay is used instead of the more obvious 5 microseconds in order to give an allowance of half a micro-second for the fall of signal on the grid of valve 19, due to loss of high frequencies in the delay network. In the arrangement shown, the black level is re-established at a value which is positive with respect to earth owing to the cathode of valve 19 being positive. The black level may be given a negative value by arranging that the cathode of valve 19 goes to a negative source of supply.

It should be noted that in connection with the frame synchronising signals which are approximately 40 micro-seconds long and are followed by 10 micro-seconds of black, the value 19 is on for 35.5 micro-seconds during the frame signal and for 4.5 micro-seconds during the succeeding black interval. The device therefore continues to operate during the frame signals.

Other methods of operation according to the invention are possible, and to illustrate this a modification of Figure 1 will be described. In this modification instead of delaying the synchronising pulses by 4.5 microseconds, they are delayed 10.5 microseconds. In order that the picture signal, which occurs during the latter portion of the control signal, does not affect the black level stabilising valve, it is necessary to connect this valve in a reverse manner to that shown in the figure. In other words, the cathode 20 of valve 19 is connected to the grid 11 and the anode of the valve is taken to a suitable positive potential. The synchronising signals are delayed by 10.5 microseconds in the delay networks 26, 27 and are applied through a transformer between the grid and cathode of valve 19. The purpose of the transformer is to apply the synchronising pulses in a positive sense between the grid and cathode of the pentode valve 19. The screening grid of valve 19 is applied with a suitable positive potential from a battery, the capacity to ground of which can be "built out" by known means. In operation the control pulse occurs 0.5 microseconds after the commencement of the 5 microseconds black period and continues for 5.5 microseconds after the termination of the black portion, that is, during the last 5.5 microseconds of the control signal there occurs 5.5 microseconds of picture signal. Since the valve 19 acts as a peak rectifier, the potential of the cathode of the valve 19 assumes the potential of the black level during the 4.5 microseconds, but because the cathode of this valve becomes more positive than the black level during the 5.5 microseconds of picture, the valve is rendered non-conducting and thus the picture signals have no effect on the stabilising device 19. For similar reasons to those already pointed out, it is necessary to delay the synchronising pulse by 10.5 microseconds instead of 10 microseconds in order to allow for the reduction in high frequencies due to the delay network.

It can be assumed that the black level at the grid 1 is subject to variation due to changes of field strength varying the signals supplied by a radio receiver to grid 1, but that the D. C. component is present in the signals applied to grid 1. When the black level is stabilised as shown the resulting synchronising signal amplitude is dependent on signal amplitude and it is possible by rectifying the signal in a subsequent stage to provide an automatic volume control potential for the radio receiver.

In the above description of Figure 1 it has been assumed that the signal applied to valve 6 contains the D. C. component but that the signal is subject to variations in effective amplitude. It will be appreciated that even if the D. C. component is lacking from the signal applied to the control grid 1 that the valve 19 will insert a D. C. component into the signal on grid 11 at the correct black level. In this case it is necessary that the condenser 17 and resistance 18 in the grid circuit of valve 19 should have a shorter time constant than those in the circuit preceding grid 1, which cause the loss of the D. C. component (the object in doing this is explained in the previously mentioned British Patent Specification No. 422,906).

Although the use of the stabilising device shown in Figure 1 has been described with particular reference to its use in a radio receiver, it will be obvious that such a device will be equally suitable for use in a television transmitter, cable link or the like for the stabilisation of the datum level.

When the D. C. component is present in an electrical signal and the signal is subject to variations in effective amplitude, it is possible according to the invention to derive a corrective potential from the variations in datum level. A particular embodiment of such an arrangement will be described with reference to Figure 2.

Figure 2 shows a circuit for producing automatic gain control potentials for a television receiver adapted to receive the aforementioned standard transmission waveform. In this figure, signals direct from a diode rectifier (not shown) of a radio receiver may be applied to control grid 30 of the tetrode valve 34 which is a cathode follower, the diode circuit being connected to a suitable potential from a potentiometer so as to supply a suitable positive potential to the grid 30 to allow for some of the potential drop occasioned by the high resistance 60 connected from the cathode 31 of valve 34 to earth. The screening grid 32 of the valve 34 is taken to a suitable positive potential not shown. A delay network represented by 35, terminated by resistance 36 is connected in the anode (33) circuit of valve 34. The output from the delay network 35 is passed through a condenser 37 to the inner grid 39 of a hexode valve 45, which acts as an "observing valve." The grid 39 of the hexode valve is connected to cathode by means of the resistance 38, the function being similar to that of leak 18 in Figure 1. The signal output from the cathode 31 of valve 34 is conveyed to the outer grid 43 of the hexode. In addition the signal is applied over lead 58 to the picture reproducing device, as for example, a cathode ray tube.

The anode 44 of the hexode 45 is connected through a resistance 48 to a positive source of potential 59, and through a condenser 49 to the cathode of a diode 50 and to the anode of a diode 51, the cathode of the latter being given a positive potential by means of a tapping on potentiometer 52, the tapping being by-passed to earth by condenser 53. The anode of diode 50 is connected through resistance 54 and resistance 55 and condenser 56 in parallel to earth, control potentials being taken off at 57, the junction point of resistances 54 and 55.

The automatic gain control is required to provide a constant signal strength at lead 58 and since the diode rectifier is directly coupled to control gride 30 and the television transmission contains the D. C. component, the desired constant level represents a constant absolute potential for black on the first cathode 31. As before synchronising signals are negative at 30 and thus are negative on the lead 58 and positive at the inner grid 39 of the hexode. Hence the hexode (assuming a sufficient synchronising signal amplitude on the inner grid 39) is only switched on during the period of the delayed synchronising signals i. e. said control signals. The two screening grids 41 and 42 of the hexode are fed from a suitable high tension source and the cathode (40) potential is fixed by means of a potentiometer 46 and by-pass condenser 47 at a value a little positive of the required value of the black potential of lead 58. During the periods between the delayed synchronising signals or control signals the inner grid 39 will be switched off and the anode 44 will be at H. T. potential 59.

The inner grid 39 will be switched on during the last 5.5 micro-seconds of the line synchronising pulse on 58 and during 4.5 micro-seconds of black. During the 5.5 micro-seconds the outer grid 43 will be driven negative by the synchronising pulse so that zero or a very small anode current will pass depending on the grid base of the outer grid 43. During the black interval, the grid 43 will rise to black level thus passing a much larger anode current and thus driving anode 44 well negative from the H. T. potential, the value of the excursion depending on the potential of 58 during the black period. During the picture periods the grid 43 will not be effective to influence the anode (or to pass grid current) since the valve 45 is shut off by the inner grid 39. The total anode voltage excursion will then be dependent on the black level at 58.

Now when the anode voltage excursions exceed the positive potential on the cathode of diode 51, the diode 50 will rectify producing in condenser 56 a negative charge which is conveyed via lead 57 to bias, for example, the control grids of the radio receiver amplifier valves. Any increase of signal strength will increase the positive black level at 43, and so will increase the voltage excursions of anode 44, and subsequently the negative potential on lead 57 and hence the receiver will be biassed to correct for the change in signal strength. The anode potential drop produced by any small current passed by the hexode during the 5.5 micro-seconds period of synchronising pulse, will be intermediate the peak potential excursions produced by black level and the "off" period of valve 45, and so will not affect the peak rectifiers 50 and 51. The positive bias on the cathode of valve 51 prevents the diode 50 from rectifying when the signals are too small to give a required black level, or are too small to operate the inner grid 39 to cut the valve 45 off during all periods except the wanted delayed synchronising signal period. This potential corresponds to the "delay potential" of a conventional automatic gain control circuit applied to receivers of sound transmissions. The small resistance 54 shown in series with the diode 50 prevents a large charge appearing on condenser 56 owing to short sharp interference pulses, such as those due to motor interference.

If the peak gain of the receiver in the absence of any automatic gain control potential is made such that the receiver does not overload on its own background potential fluctuations, due, for example, to the "shot" effect in the valves and similar causes, and steady local interference, then, when switched on, the synchronising pulses will always arrive at the inner grid 39 and will generate on the anode 44 pulses, which produce automatice gain control potentials and the latter will reduce the gain of the amplifiers until the correct level (less the small variation necessary to produce the correct control) is obtained on grid 43. Any very large black signals, which, when the receiver is first switched on, cause grid current to flow in grid 43 will not unduly affect operation due to the D. C. coupling from the cathode of the first valve 34. The time constant of resistance 55 and condenser 56 must be sufficient to stop any appreciable variation of gain during the intervals between blacks and must be long enough to prevent any tendency for self-oscillation in the circuit.

As in the case of valve 19 in Figure 1, the hexode 45 will also operate on the black level signals transmitted between the frame synchronising pulses. It should be noted that the hexode 45 has been so arranged according to this invention as to be unaffected by the control signals during the unwanted 5.5 micro-seconds of control pulse. This therefore effects an economy since the delayed synchronising pulse serves (without any shortening of pulse time) as the control signal of the observing device.

Various modifications of this circuit lie within the scope of this invention, for example, the exact arrangement of hexode shown need not necessarily be used and other devices such as double diodes may be used after the manner described in the co-pending British Application No. 7941/37.

Similarly a manual control may be provided in order to fix the exact black level, such a control, for example, varying the potential on the cathode of the hexode 45. The lead 58 may be taken from a potentiometer used as the cathode resistance of the first valve 34 so as to control the contrast of the picture.

The grid 30 may be fed not from a receiver rectifier but from an amplifier which may be D. C. coupled, or, if A. C. coupled, the D. C. component may be re-established with reference to the peaks of synchronising signals by a suitable diode or other device as described in British Patent Specification 422,906.

Furthermore the control potentials may be used to control a modulation frequency amplifier (instead of a radio frequency amplifier) prior to control grid 30, as, for example, in an amplifier system used in cable transmission, the black level being subject to variation owing to casual variations in gain of the amplifier or to variable attenuation in the transmission lines.

It will be obvious that the automatic gain control circuit described with reference to Figure 2 will be equally applicable to use in a television transmitter for the correction of variations in the effective amplification of the circuits.

Again, the rectifier first mentioned as supplying signals to valve 34 may be a rectifier worked by a small portion of the output from a television transmitter, the control potential obtained at 57 being used to hold the black level transmitted at a substantially constant potential.

Rectifier arrangements other than those shown at 50 and 51 may be used, or the actual direct direct current flowing through valve 45 may be used to affect the necessary control. Further, the output on lead 57 may operate an indicating device purely to indicate the black level to an operator.

In the case where the signal applied to the radio receiver does not contain the D. C. component and the signal is subject to variable attenuation it is necessary to derive a correction signal dependent upon the difference between two different received amplitudes both of which have fixed values at the transmitter. Thus, it is necessary to give the signals a datum coincident with that representing the synchronising peaks at zero carrier at the transmitter with the aid of a D. C. re-inserting device of the kind described in British Patent Specification 422,906, for example, and at the same time the signals are used to derive a corrective signal dependent upon the amplitude of the black level in the manner already described.

It is not necessary that the datum level should be at black level and the television waveforms described above need not necessarily be used, other waveforms as described for example, in the prior British Specifications 449,242 and 458,585 being suitable.

Whilst it is preferred to derive the control signals for switching on the stabilising or observing device from the synchronising or equivalent signals it will of course be understood that such control signals may be locally generated signals or signals derived therefrom.

Among other types of waveform to which the present invention can be applied is one in which synchronising signals comprise reductions of the amplitude of the waveform from black level to zero, the synchronising signals being followed immediately by amplitudes greater than the maximum picture amplitude, this latter pulse serving for automatic gain control purposes. The black level datum portions may follow immediately after the A. G. C. pulse. Such a wave form is useful in television relay systems for the purpose of obtaining and maintaining the correct ratio of picture signal to synchronising pulse amplitude. In this particular application the A. G. C. pulses are used to keep a constant picture output, the datum portion being stabilised as herein described, thus maintaining the synchronising signals and picture signals in the correct ratio; this ratio may alter in practice due to the fact that successive valve stages may cause crushing of the synchronising signals, due to the curvature of the valve characteristics. In addition, such a system may be used for the purpose of indicating to the control engineers operating a television transmitter whether the level of the transmission is altering. Of course, in using such a waveform either the synchronising pulses of the A. V. C. pulses can be used for the purpose of deriving controlling pulses for switching the stabilising device during the black period.

We claim:

1. A television system for the insertion of the back-ground level or direct current component of the picture signal comprising a first electron discharge tube having a cathode, a control electrode and an anode, means including a delay network for maintaining the anode positive with respect to the cathode, means for applying picture and synchronizing signals between the control electrode and the cathode with the synchronizing signals in a negative direction, a second electron discharge tube having a cathode, a control electrode and an anode, means for coupling the anode of said second tube to the cathode of said first tube, means for coupling the control electrode of said second tube to the output of said delay network, a resistance included between the control electrode and the cathode of said second discharge tube, means for maintaining the anode positive with respect to the cathode of said second discharge tube, and a utilization circuit coupled to the anode of said second discharge tube whereby the potential at the anode of the second discharge tube will depend upon the intensity of the synchronizing impulses as applied to said first tube to affect the utilization circuit in accordance with the direct current component of the applied picture signals.

2. A television system for the insertion of the direct current component of a picture signal series comprising a first electron discharge tube having a cathode, a control electrode and an anode, means including a delay network for maintaining the anode positive with respect to the cathode, means for applying picture and synchronizing signals between the control electrode and the cathode with the synchronizing signals in a negative direction, a second electron discharge tube having a cathode, a control electrode and an anode, means for coupling the anode of the second tube to the cathode of the first tube, means for coupling the control electrode of the second tube to the output of said delay network, whereby the picture and synchronizing signals may be impressed upon the anode of the second discharge tube with the synchronizing signals in a negative direction and whereby the delayed picture and synchronizing signals may be impressed upon the control electrode of the second tube with the synchronizing signals in a positive direction, means for maintaining the anode of said second tube positive with respect to its cathode by an amount such that the tube passes current only upon the presence of synchronizing signals, and a utilization circuit coupled to the anode of said second tube whereby the potential of the signals impressed upon the utilization circuit will depend upon the background level of the picture signals.

3. A television system for the insertion of the direct current component of a picture signal series comprising a first electron discharge tube having a cathode, a control electrode and an anode, means including a delay network for maintaining the anode positive with respect to the cathode, means for applying picture and synchronizing signals between the control electrode and the cathode with the synchronizing signals in a negative direction, a second electron discharge tube having a cathode, a control electrode and an anode, means for coupling the anode of the second tube to the cathode of the first tube, means for coupling the control electrode of the second tube to the output of said delay network, means for maintaining the anode of said second tube positive with respect to its cathode by a predetermined amount, a resistance for connecting the control electrode of said second tube to its cathode, and a utilization circuit coupled to the anode of said second tube, whereby when the picture and synchronizing signals are applied to the anode and control electrode of said second tube with the synchronizing signals in a negative and positive direction respectively, the potential of the signals as applied to the utilization circuit will be varied in accordance with the direct current component of the picture signals.

ALAN DOWER BLUMLEIN.
ERIC LAWRENCE CASLING WHITE.